No. 743,422. Patented November 10, 1903.

UNITED STATES PATENT OFFICE.

DAVID BACHRACH, OF BALTIMORE, MARYLAND, ASSIGNOR OF ONE-THIRD TO EMILE BERLINER, OF WASHINGTON, DISTRICT OF COLUMBIA.

COMPOUND OF NITROCELLULOSE OR SIMILAR SUBSTANCES.

SPECIFICATION forming part of Letters Patent No. 743,422, dated November 10, 1903.

Application filed January 29, 1903. Serial No. 141,077. (No specimens.)

*To all whom it may concern:*

Be it known that I, DAVID BACHRACH, a citizen of the United States, residing at the city of Baltimore, in the State of Maryland, have invented certain new and useful Improvements in Making Compounds of Nitrocellulose or Similar Substances Used in the Arts Non-Inflammable or Only Slowly Inflammable, of which the following is a specification.

In my specification forming part of Letters Patent No. 667,759, dated February 12, 1901, I describe a process accomplishing this purpose; but in practice I found the results not as perfect as by the process herein described, one of the objections being a rather brittle product, except when made with very high pressure, owing to the large amount of acid and pigment necessary for making it entirely non-inflammable.

In the process described herein not more than one-third the quantity of acid is used and a less proportion of pigment is present in the finished product; so I obtain more flexibility and greater tensile strength.

I have discovered that free hydrochloric acid produced by reaction in the compound of pyroxylin and camphor, known as "celluloid," "pyrallin," &c., and a suitable absorbent for the same gives me the desired result.

I proceed about as follows: For making the compound totally non-inflammable I unite four parts of pyroxylin with two parts of camphor with a suitable solvent, and to this I add two parts, finely pulverized, chlorid of calcium (or any other suitable chlorid or hydrochlorate or modified forms of the same) and one part, by weight, of sulfuric acid. This mixture must be thoroughly united and combined, and then four parts, by weight, of fine calcined plaster (sulfate of lime) are added. This mass when thoroughly mixed and seasoned is treated with hydraulic pressure and heat in the usual way. The reason I prefer forming the free hydrochloric acid in the mass by chemical reaction instead of adding it direct is that less acid is required and is more easily assimilated with it, though the hydrochloric acid may also be added direct. The sulfate of lime unites with and absorbs the free acid and the water formed in the mass and makes them inert and harmless when the mass is dry. So thoroughly does this neutralize combustion that after the mass has been mixed for some months it will not ignite in ordinary flame even when in powdered form. Any chlorid or hydrochlorate may be used that forms with sulfuric acid a sulfate not soluble in water.

If hydrochlorate of turpentine be used instead of camphor as a solvent for the pyroxylin, no other chlorid or hydrochlorate need be used, only using enough of excess of the hydrochlorate of turpentine to form the reaction with the acid.

I do not confine myself to the proportions above stated, as they may be varied. A less proportion of the acid, salts, and pigment may be used for a slow-burning compound if more flexibility is desired and a little greater proportion if great resistance to heat is desired, depending somewhat on the nature of the pyroxylin used; but the proportions herein given are generally correct under ordinary circumstances.

It will be seen that the principle involved in this method is entirely different from my former process. In that method with neutral pyroxylin I used four times the quantity of acid used in this method with an antacid to form an insoluble neutral compound in the mass and carefully eliminated all acid from the substance. In this method I introduce and keep in the mass a free acid direct or by reaction on a salt, the acid of which is freed and remains in the compound and displaces the acid first added and is retained inert therein by an absorbent.

I have also found by soaking the mass in water, finely divided or otherwise, the sulfate of lime or other pigment absorbs an additional quantity of water and retains it as water of crystallization without parting with the free acid absorbed to any considerable extent, if not allowed to remain in water too long, and this makes the mass still less combustible and enables me to use less pigment to accomplish the object. There are other absorbents that may be used; but they must be insoluble in water or acids and not of a nature to change the free hydrochloric acid. I prefer the sulfate of lime as being the most practical.

The essential part of my method is to retain the quality of non-inflammability given to the pyroxylin compound by the free acid and water in an insoluble absorbent-like sulfate of lime as liquids of crystallization, and this absorbent is not used temporarily as means to an end, but is retained in the compound without loss or change and is the only method at present practically devised for making such compounds permanently non-inflammable.

What I claim is—

1. A non-inflammable or slow-burning compound of nitrocellulose containing in addition to the usual constituents thereof, free hydrochloric acid, an insoluble absorbent and water of crystallization, substantially as described.

2. A non-inflammable or slow-burning compound of nitrocellulose, obtained by adding to the usual constituents thereof a salt of hydrochloric acid and sulfuric acid, which, by reaction, forms free hydrochloric acid in the compound, and a suitable absorbent, substantially as described.

3. The process of making a non-inflammable or slow-burning compound of nitrocellulose, obtained by adding to the usual constituents thereof a salt of hydrochloric acid and sulfuric acid to form by reaction with said salt free hydrochloric acid, a suitable absorbent, and introducing water of crystallization in the same by absorption, substantially as described.

DAVID BACHRACH.

Witnesses:
MARY E. HANNA,
LOUIS F. BACHRACH.